US012123365B2

(12) United States Patent
Duez et al.

(10) Patent No.: US 12,123,365 B2
(45) Date of Patent: Oct. 22, 2024

(54) METHOD OF CONTROLLING WATER INJECTION IN AN INTERNAL COMBUSTION ENGINE

(71) Applicant: PLASTIC OMNIUM ADVANCED INNOVATION AND RESEARCH, Brussels (BE)

(72) Inventors: Laurent Duez, Brussels (BE); Stéphane Leonard, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 18/250,852

(22) PCT Filed: Oct. 29, 2021

(86) PCT No.: PCT/EP2021/080127
§ 371 (c)(1),
(2) Date: Apr. 27, 2023

(87) PCT Pub. No.: WO2022/090467
PCT Pub. Date: May 5, 2022

(65) Prior Publication Data
US 2023/0383704 A1 Nov. 30, 2023

(30) Foreign Application Priority Data
Oct. 30, 2020 (LU) ........................................ 102187

(51) Int. Cl.
*F02D 19/12* (2006.01)
*F02M 25/022* (2006.01)
*F02M 25/025* (2006.01)
(52) U.S. Cl.
CPC ......... *F02D 19/12* (2013.01); *F02M 25/0222* (2013.01); *F02M 25/0224* (2013.01);
(Continued)

(58) Field of Classification Search
CPC ............ F02M 25/025; F02M 25/0227; F02M 25/0224; F02M 25/022; F02D 19/12
See application file for complete search history.

(56) References Cited

U.S. PATENT DOCUMENTS 10,012,133 B1 * 7/2018 Martin ...................... F01P 5/10
2013/0167622 A1 7/2013 Frivik
(Continued)

FOREIGN PATENT DOCUMENTS

CN 101706464 A 5/2010
DE 10 2016 205 146 A1 10/2017
(Continued)

OTHER PUBLICATIONS

International Search Report issued Mar. 9, 2022 in PCT/EP2021/080127 filed on Oct. 29, 2021, 3 pages.

*Primary Examiner* — Kevin A Lathers
(74) *Attorney, Agent, or Firm* — Oblon, McClelland, Maier & Neustadt, L.L.P.

(57) ABSTRACT

A method of controlling water injection in an internal combustion engine for a motor vehicle in case of freezing cold weather. The method includes: controlling the quality of the water, having a first sub-step of disapproving the quality of the water if the electrical conductivity σ of the water is not zero nor close to zero when the temperature T of the water is 0° C. or less and a second sub-step of approving the quality of the water if the electrical conductivity σ of the water is zero or close to zero when the temperature T of the water is higher than −4° C., preferably higher than −2° C. The method further includes a second sub-step of preventing water injection if the quality of the water is disapproved and a third step of allowing water injection if the quality of the water is approved.

18 Claims, 2 Drawing Sheets

(52) U.S. Cl.
CPC ...... *F02M 25/0227* (2013.01); *F02M 25/025* (2013.01); *F02D 2200/50* (2013.01)

(56) References Cited

U.S. PATENT DOCUMENTS

| | | | |
|---|---|---|---|
| 2014/0366512 A1 | 12/2014 | Hodgson et al. | |
| 2018/0079280 A1* | 3/2018 | Leone | ................ B60H 1/00271 |
| 2018/0094593 A1* | 4/2018 | Leone | ................ F02M 25/0227 |
| 2019/0203664 A1 | 7/2019 | Leonard et al. | |
| 2019/0338731 A1 | 11/2019 | Burak et al. | |

FOREIGN PATENT DOCUMENTS

| | | |
|---|---|---|
| DE | 10 2017 006 080 A1 | 1/2019 |
| DE | 10 2018 210 965 A1 | 1/2020 |
| WO | WO 2014/037144 A1 | 3/2014 |
| WO | WO 2018/050895 A1 | 3/2018 |
| WO | WO 2019/154934 A1 | 8/2019 |
| WO | WO 2019/229186 A1 | 12/2019 |

\* cited by examiner

METHOD OF CONTROLLING WATER INJECTION IN AN INTERNAL COMBUSTION ENGINE

TECHNICAL FIELD OF THE INVENTION

The present invention relates to a method of controlling water injection in an internal combustion engine for a motor vehicle in case of freezing cold weather.

The invention also relates to a water injection system configured for implementing the method according to the invention. The invention further relates to an internal combustion engine system and a motor vehicle configured for implementing the method according to the invention. The invention also further relates to a non-transitory computer-readable medium for executing by a processor the steps of the method according to the invention.

BACKGROUND OF THE INVENTION

In water injection systems for injecting water into an internal combustion engine of a motor vehicle, the quality of the water is controlled prior to its injection. A typical quality control operation relies on a quality sensor device to measure characteristics representative of the quality of a water prior to its injection. A typical characteristic representative of the quality of a water is the electrical conductivity of the water to be injected. Indeed, most water injection systems operate with demineralized water. A demineralized water is defined as a water having an electrical conductivity of 150 µS/cm or less at room temperature. Therefore, a non-demineralized water is defined as a water having an electrical conductivity greater than 150 µS/cm at room temperature. Usually, room temperature ranges from about 20° C. to about 25° C.

In a water injection system operating with demineralized water, the water injection system comprises an electrical conductivity sensor that can discriminate between demineralized and non-demineralized water and an electronic control unit that can approve or disapprove the quality of the water based on the electrical conductivity measurement information.

A system and a method for the selective prevention of passage of a fluid in a motor vehicle using a device for identifying intrinsic characteristics of the fluid and a device for allowing or closing the passage of the fluid, depending on the identified characteristics, are known from the document WO19154934.

In current water injection systems operating with demineralized water, the electrical conductivity sensor measures the electrical conductivity of the water when the water is in liquid form. For example, the document US2019/0338731 discloses a water injection device of an internal combustion engine comprising a water quality and water fill level detection device for detecting a quality of the water in the water tank and a fill level of the water tank. To detect the water quality, a conductivity of the water can be determined based on charging and discharging a capacitor. Additionally, the water injection device comprises a temperature sensor for recording a temperature of the water, which is considered when determining the fill level.

The methods as known in the prior art are only intended to be implemented with water in liquid form. However, in winter ice conditions, the water contained in a water injection tank of a motor vehicle can freeze. When the water contained in the water injection tank is frozen, a heater is used to thaw it because the water must be in liquid form to be able to be injected into an internal combustion engine of a motor vehicle. However, the water injection is not started until the electrical conductivity of the water is approved by the electronic control unit.

In most cases, due to the heating system present in the water injection tank, thawed water is available at a pump intake of the water injection tank while the water around the electrical conductivity sensor is still frozen. Therefore, in current water injection systems operating with demineralized water, water is available for water injection but it cannot be injected because the electrical conductivity of the liquid water in the tank cannot be measured. As the electrical conductivity of ice cannot be compared to that of liquid water, in the known water injection systems, the electrical conductivity of the frozen part of the tank is not measured or not taken into account, because this information is considered not to be representative of the thawed water. Consequently, cold start injection time is prolonged until the temperature of the frozen water, also known as "ice", around the electrical conductivity sensor is high enough so that the ice is thawed.

In view of the above, there exists a need for a method of controlling water injection in an internal combustion engine for a motor vehicle in case of freezing cold weather wherein water in a water injection tank is at least partially frozen, that overcomes drawbacks of prior art methods.

SUMMARY OF THE INVENTION

The present invention provides a method of controlling water injection in an internal combustion engine for a motor vehicle in case of freezing cold weather. The method comprises the steps of:
(a) determining a temperature T of the water contained in a water injection tank around a conductivity sensor,
(b) controlling the quality of the water, which comprises the following step:
(b10) disapproving the quality of the water if the electrical conductivity σ of the water is not zero nor close to zero,
(c) preventing water injection if the quality of the water is disapproved,
wherein step (b) is performed when the determined temperature T of the water is below 0° C.

By "the determined temperature T of the water is below 0° C.", it should be understood that "the determined temperature T of the water is 0° C. or less". It is to be noted that the temperature T of the water is controlled at atmospheric pressure. Furthermore, water is considered frozen when the determined temperature T of the water is 0° C. or less at atmospheric pressure. Thus, it is to be understood that step b is performed when the water is considered frozen around the conductivity sensor.

By "determining a temperature T of the water contained in a water injection tank around a conductivity sensor", it should be understood that the temperature T is determined in the vicinity of the conductivity sensor. Preferably, the temperature is determined at a distance lower than 100 mm of the conductivity sensor, more preferably lower than 50 mm, most preferably lower than 30 mm.

In a preferred embodiment, the step of "determining a temperature T of the water" is a step of measuring a temperature T by a temperature sensor situated around the conductivity sensor. In addition, in such a case, by "the temperature is determined at a distance lower than 100 mm", it is to be understood that the temperature sensor and the electrical conductivity sensor comprise each a sensing surface, and the distance between the sensing surface of the temperature sensor and the sensing surface of the electrical conductivity sensor is 100 mm or less.

Moreover, it should be understood that above steps a and b are not necessarily successive nor independent steps, they can be performed simultaneously or else step a of determining temperature can be performed into step b, for example just before step b10.

The applicant has performed a series of experiments to measure the electrical conductivity of both demineralized water and non-demineralized water at different temperatures. It has been discovered that the electrical conductivity is a relevant characteristic to be measured because it provides interesting information even if the water is considered frozen, ie. if the determined temperature T is below 0° C. Based on applicant's experimental data, it has been observed that, when the temperature T of the water is below −4° C. (minus four Celsius degrees), the electrical conductivity of both demineralized water and non-demineralized water is zero or close to zero whereas, when the temperature T of the water is between −4° C. and 0° C., preferably between −2° C. and 0° C., the electrical conductivity of non-demineralized water is not zero nor close to zero whereas the electrical conductivity of demineralized water is zero or close to zero. Therefore, the method according to the invention allows discriminating between demineralized and non-demineralized water not only before all water is available in liquid form for water injection, but also before any water is available in liquid form around the conductivity sensor.

According to other optional features of the method, taken alone or in combination:
In a preferred embodiment, the method further comprises the steps of:
(b20) approving at step (b) the quality of the water if the electrical conductivity σ of the water is zero or close to zero when the determined temperature T of the water is higher than a predetermined threshold $T_{min}$;
(d) allowing water injection if the quality of the water is approved,
wherein the value of the predetermined threshold $T_{min}$ is higher than −4° C., preferably higher than −2° C.

Based on applicant's experimental data, it has been observed that, when the temperature T of the water is between −4° C. and 0° C., the electrical conductivity of demineralized water is zero or close to zero. Therefore, the method according to the preferred embodiment allows reducing the cold start injection time when the water has a desired water quality by avoiding unnecessary waiting for the ice around the electrical conductivity sensor to be thawed. In practice, the temperature range between −2° C. and 0° C. is preferred because it allows a better discrimination of demineralized water.

In a preferred embodiment, the water is heated when the determined temperature T is less than the predetermined threshold $T_{min}$ until the determined temperature T reaches at least the predetermined threshold $T_{min}$. This allows bringing the water in a range of temperatures where demineralized water can be differentiate from non-demineralized water. It will be understood that the water can continue to be heated after the determined temperature T has reached the predetermined threshold $T_{min}$.

In a preferred embodiment, the electrical conductivity σ of the water is close to zero when its value σ is less than or equal to a predetermined threshold of electrical conductivity $\sigma_{max}$, wherein the value of the predetermined threshold of electrical conductivity $\sigma_{max}$ is 30 μS/cm, more preferably 20 μS/cm, and most preferably 10 μS/cm. This allows comparing a sensed electrical conductivity value of the water to a predetermined threshold of electrical conductivity value. The predetermined threshold of electrical conductivity value is set so as to be adapted for different electrical conductivity sensors having different sensitivities when the actual electrical conductivity of the water is close to zero.

An object of the present invention concerns also a water injection system configured for implementing the method of controlling water injection in an internal combustion engine for a motor vehicle according to the invention. The water injection system comprises:
a water injection tank for storing the water,
an electrical conductivity sensor for sensing the electrical conductivity σ of the water in the water injection tank,
a temperature determining means for determining the temperature T of the water in the water injection tank around the conductivity sensor,
a comparator for comparing the sensed electrical conductivity σ to the predetermined threshold of electrical conductivity $\sigma_{max}$,
a water injection pump for supplying water from the water injection tank to an injection line configured to be connected to the internal combustion engine,
a first electronic control unit for approving or disapproving the quality of the water.

It is therefore to be understood that the water injection system is configured for sensing the electrical conductivity σ of the water in the water injection tank even when the determined temperature is below 0° C. In a preferred embodiment of the invention, the water injection system is configured for sensing the electrical conductivity σ of the water in the water injection tank when the determined temperature T is higher than a predetermined threshold $T_{min}$, the predetermined threshold $T_{min}$ being higher than −4° C., preferably higher than −2° C.

According to other optional features of the water injection system, taken alone or in combination:
In a preferred embodiment, the comparator is part of the first electronic control unit. This allows the first electronic control unit to take responsibility for all calculations carried out in the method according to the present invention.
In a preferred embodiment, the first electronic control unit also takes responsibility for allowing or preventing water injection by controlling the water injection pump, based on the quality of the water.
In a preferred embodiment, the water injection system further comprises a heater for heating the water stored in the water injection when the determined temperature T is less than the predetermined threshold $T_{min}$ until the determined temperature T reaches at least the predetermined threshold $T_{min}$. This allows bringing the water in a range of temperatures where demineralized water can be differentiated from non-demineralized water.
In a preferred embodiment, the temperature determining means comprise a temperature sensor. This allows a direct determination of the temperature T of the water in the water injection tank around the conductivity sensor.
In a preferred embodiment, the temperature sensor and the electrical conductivity sensor comprise each a sensing surface, and the distance between the sensing surface of the temperature sensor and the sensing surface of the electrical conductivity sensor is 30 mm or less. This allows to accurately measure the temperature of the water at the electrical conductivity sensor and properly associate a sensed electrical conductivity value to a corresponding sensed temperature value. In addition, this allows the step of determining a temperature around the conductivity sensor to be a step of measuring the temperature by the temperature sensor.

In a preferred embodiment, the temperature sensor and the electrical conductivity sensor are part of a quality sensor device. This allows providing the electrical conductivity sensor together with the temperature sensor in a same packaging.

In a preferred embodiment, the water injection tank comprises a water delivery module. A water delivery module is a module comprising a baseplate configured to be positioned through an opening made in a wall of the water injection tank and a pump unit configured to pump water from the water injection tank and deliver it to a supply line of a water consuming device, for instance, an injection line connected to the internal combustion engine.

In a preferred embodiment, the water delivery module comprises the water injection pump, the temperature determining means, the electrical conductivity sensor and the heater. This allows the various components of a water injection system according to the invention to be brought together in a smaller volume than the volume of the water injection tank, thus offering improved packaging and assembly processes for original equipment manufacturers (OEM).

It is another object of the present invention to provide an internal combustion engine system configured for implementing the method of controlling water injection in an internal combustion engine for a motor vehicle in case of freezing cold weather. The internal combustion engine system comprises an internal combustion engine and a water injection system according to the previous object of the invention.

In an embodiment, the internal combustion engine system comprises a second electronic control unit for commanding and controlling the first electronic control unit, for example, for allowing or preventing water injection by controlling the water injection pump.

In an alternative embodiment, the comparator is part of the second electronic control unit and the second electronic control unit controls the water injection pump for allowing or preventing water injection, based on the quality of the water. This arrangement makes it possible to replace the first electronic control unit with the second electronic control unit and remove the first electronic control unit.

It is another object of the present invention to provide a motor vehicle configured for implementing the method of controlling water injection in an internal combustion engine for a motor vehicle. The motor vehicle comprises an internal combustion engine system according to the previous object of the invention.

It is another object of the present invention to provide a non-transitory computer-readable medium comprising instructions of controlling water injection in an internal combustion engine for a motor vehicle, which, when executed by a processor, cause the processor to perform steps of the method according to the invention.

DESCRIPTION OF ILLUSTRATIVE EMBODIMENTS

Figure 1:
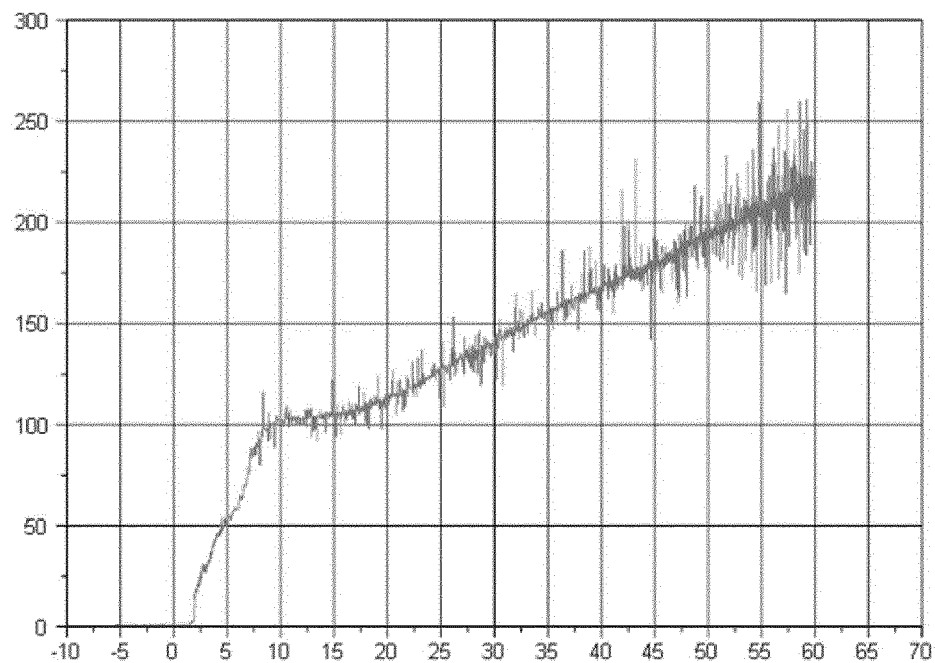
FIG. 1 is a graph illustrating how the electrical conductivity of demineralized water change with temperature.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

FIG. 1 is a graph of experimental data, wherein the x-axis represents the temperature T1 of demineralized water in ° C. (degree Celsius) and the y-axis represents the electrical conductivity σ1 of the demineralized water in μS/cm (microsiemens per centimeter). This graph has been constructed with actual values of σ1 as T1 gradually increases from −10° C. to 60° C. For this first set of experiments, a water tank is filled with 10 liters of a reference demineralized water. A reference demineralized water is a water having a conductivity of 150 μS/cm or less at room temperature, which is considered to be acceptable water for water injection in an internal combustion engine. The water tank comprises a temperature sensor for sensing T1, an electrical conductivity sensor for sensing σ1 and a heater for heating the demineralized water stored in the water tank. In an example, the electrical conductivity sensor senses at zero electrical frequency, i.e. it is a DC measurement. Alternatively, it may be an AC measurement. The heater is typically an electrical heater. The temperature sensor and the electrical conductivity sensor comprise each a sensing surface. In order to accurately measure the temperature of the demineralized water at the electrical conductivity sensor and properly associate a sensed electrical conductivity value to a corresponding sensed temperature value, the distance between the sensing surface of the temperature sensor and the sensing surface of the electrical conductivity sensor is 30 mm or less. The water tank is placed in a climatic chamber the time required to freeze the demineralized water. When the temperature of the demineralized water reaches −10° C. or less, the heater is activated to heat the demineralized water until T1 reaches at least 60° C.

During temperature increase, the applicant has found that σ1 is zero or close to zero when T1 increases from −10° C. to about 2° C., then σ1 increases with T1 when T1 increases from about 2° C. to 60° C.

Figure 2:
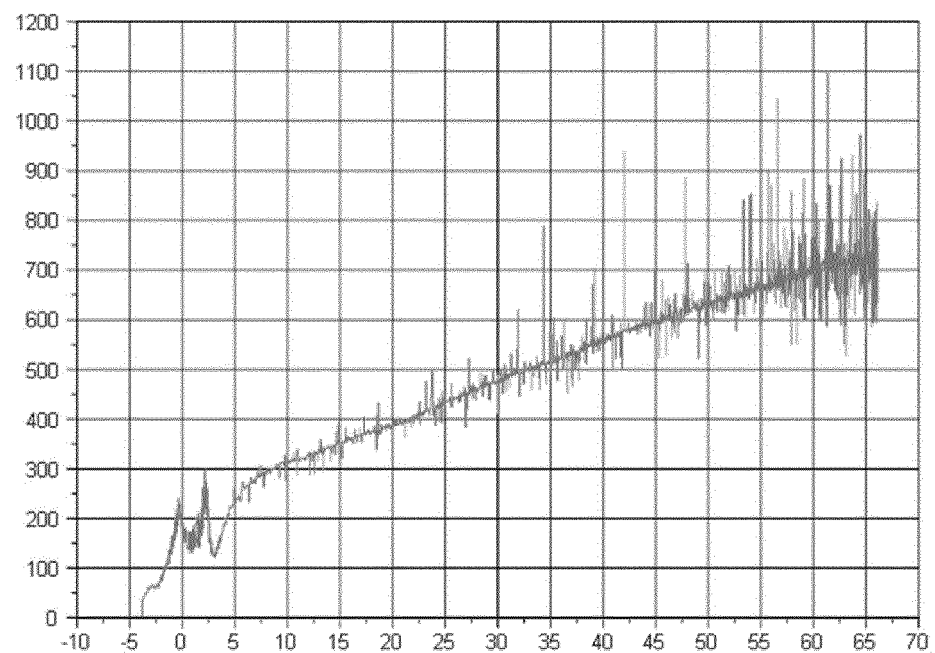
FIG. 2 is a graph illustrating how the electrical conductivity of non-demineralized water change with temperature.

FIG. 2 is a graph of experimental data similar to the graph of FIG. 1, wherein demineralized water is replaced with non-demineralized water. The x-axis represents the temperature T2 of non-demineralized water in ° C. and the y-axis represents the electrical conductivity σ2 of the non-demineralized water in μS/cm. This graph has been constructed with actual values of σ2 as T2 gradually increases from −10° C. to 66° C. For this second set of experiments, a water tank is filled with 10 liters of non-demineralized water. The water tank comprises a temperature sensor for sensing T2, an electrical conductivity sensor for sensing σ2 and a heater for heating the non-demineralized water stored in the water tank. The heater is typically an electrical heater. The temperature sensor and the electrical conductivity sensor comprise each a sensing surface. In order to accurately measure the temperature of the non-demineralized water at the electrical conductivity sensor and properly associate a sensed electrical conductivity value to a corresponding sensed temperature value, the distance between the sensing surface of the temperature sensor and the sensing surface of the electrical conductivity sensor is 30 mm or less. The water tank is placed in a climatic chamber the time required to freeze the non-demineralized water. When the temperature of the non-demineralized water reaches −10° C. or less, the heater is activated to heat the non-demineralized water until T2 reaches at least 60° C.

During temperature increase, the applicant has found that σ2 is zero or close to zero when T2 increases from −10° C. to about −4° C., then 62 increases with T2 when T2 increases from about −4° C. to 60° C.

By comparing the outputs of the first and second set of experiments, the applicant has found a reliable way to discriminate between demineralized and non-demineralized water. Indeed, if the electrical conductivity σ of a water is not zero nor close to zero when the temperature T of the water is 0° C. or less at atmospheric pressure, for example, when T is about −2° C., then it means that the water is non-demineralized.

Figure 3:
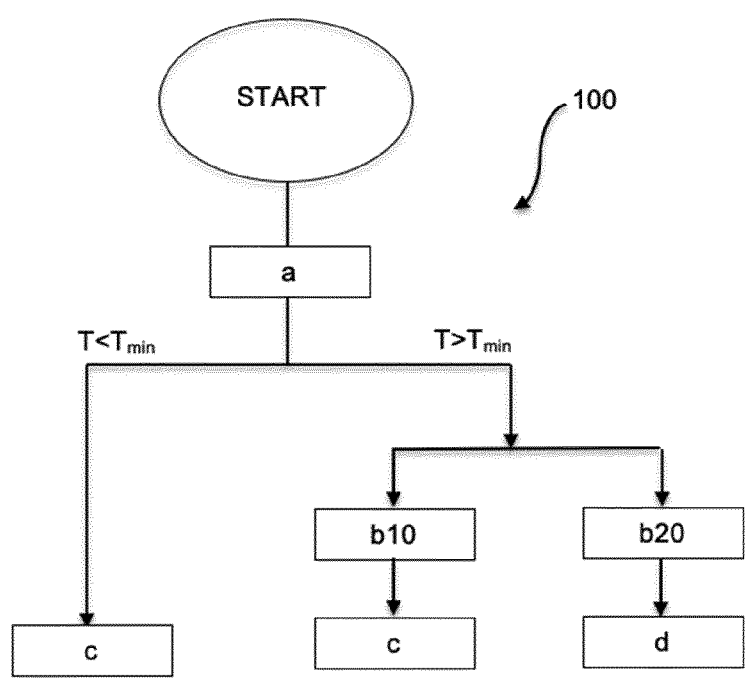
FIG. 3 is a flow diagram of a method of controlling water injection in an internal combustion engine for a motor vehicle in case of freezing cold weather according to the invention.

FIG. 3 shows an example method 100 of controlling water injection in an internal combustion engine for a motor vehicle in case of freezing cold weather, in accordance with the present disclosure. At step Start, method 100 starts. At step a, method determines the temperature T of the water contained in a water injection tank around a conductivity sensor. At step b, method controls the quality of the water. At step c, method prevents water injection if the quality of the water is disapproved. At step d, method allows water injection if the quality of the water is approved. Method 100 may then end.

Step b comprises two sub-steps: sub-step b10 and sub-step b20. At sub-step b10, method 100 disapproves the quality of the water if the electrical conductivity σ of the water is not zero nor close to zero when the determined temperature T of the water is 0° C. or less. At sub-step b20, method 100 approves the quality of the water if the electrical conductivity σ of the water is zero or close to zero when the determined temperature T of the water is higher than a predetermined threshold $T_{min}$, wherein the value of the predetermined $T_{min}$ is higher than −4° C., preferably higher than −2° C.

When $T<T_{min}$, method 100 heats the water until T reaches at least $T_{min}$.

At sub-steps b10 and b20, method 100 compares the electrical conductivity σ of the water to a predetermined threshold of electrical conductivity $\sigma_{max}$. In the context of the invention, the electrical conductivity σ of the water is close to zero when its value σ is less than or equal to the predetermined threshold of electrical conductivity $\sigma_{max}$, wherein the value of the predetermined threshold of electrical conductivity $\sigma_{max}$ is 30 μS/cm, more preferably $\sigma_{max}$ is 20 μS/cm, and most preferably $\sigma_{max}$ is 10 μS/cm.

Figure 4:
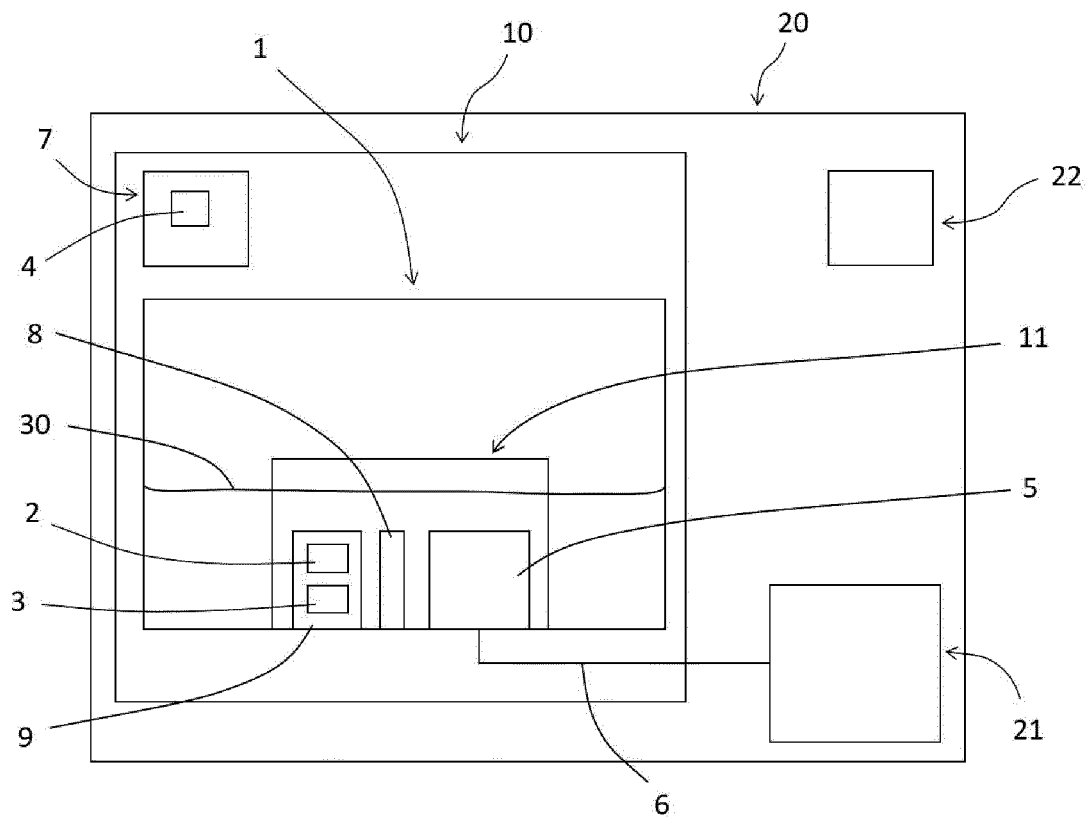
FIG. 4 is a diagrammatic view of a water injection system and an internal combustion engine system according to the invention.

FIG. 4 shows a water injection system 10 configured for implementing the method of controlling water injection in an internal combustion engine for a motor vehicle in case of freezing cold weather. The water injection system comprises:
- a water injection tank 1 for storing water 30,
- an electrical conductivity sensor 3 for sensing the electrical conductivity σ of the water in the water injection tank 1,
- a temperature determining means 2 for determining the temperature T of the water in the water injection tank 1 around the conductivity sensor 3,
- a comparator 4 for comparing the sensed electrical conductivity σ to the predetermined threshold of electrical conductivity $\sigma_{max}$,
- a water injection pump 5 for supplying water from the water injection tank 1 to an injection line 6 configured to be connected to the internal combustion engine,
- a first electronic control unit 7 for approving or disapproving the quality of the water.

It's to be understand that the temperature determining means can be a temperature sensor or any other means for determining the temperature of the water in the specific zone around the conductivity sensor.

The water injection system 10 is configured for sensing the electrical conductivity σ of water in the water injection tank 1 even when the determined temperature T is below 0° C. In addition, the water injection system 10 is advantageously configured for sensing the electrical conductivity σ of the water in the water injection tank 1 when the determined temperature T is higher than the predetermined threshold $T_{min}$.

Advantageously, the comparator 4 is part of the first electronic control unit 7.

Advantageously, the first electronic control unit 7 controls the water injection pump 5 for allowing or preventing water injection, based on the quality of the water.

The water injection system 10 further comprises a heater 8 for heating the water 30 stored in the water injection tank 1 when $T<T_{min}$ until T reaches at least $T_{min}$.

Advantageously, the temperature sensor 2 and the electrical conductivity sensor 3 are close to each other, so that the temperature measured by the temperature sensor 2 substantially corresponds to the temperature of the water around (which means very closed to) the electrical conductivity sensor 3.

In a very interesting embodiment, the temperature sensor 2 and the electrical conductivity sensor 3 are part of a quality sensor device 9.

The temperature sensor 2 and the electrical conductivity sensor 3 comprise each a sensing surface, and the distance between the sensing surface of the temperature sensor 2 and the sensing surface of the electrical conductivity sensor 3 is 30 mm or less.

The water injection tank 1 comprises a water delivery module 11.

Advantageously, the water delivery module 11 comprises the water injection pump 5, the temperature sensor 2, the electrical conductivity sensor 3 and the heater 8.

FIG. 4 shows also an internal combustion engine system 20 configured for implementing the method of controlling water injection in an internal combustion engine for a motor vehicle in case of freezing cold weather. The internal combustion engine system 20 comprises an internal combustion engine 21 and the water injection system 10.

The internal combustion engine system 20 comprises a second electronic control unit 22 for commanding and controlling the first electronic control unit 7, for example, for allowing or preventing water injection by controlling the water injection pump 5.

In an alternative arrangement (not shown), the comparator is part of the second electronic control unit 22 and the second electronic control unit 22 controls the water injection pump 5 for allowing or preventing water injection, based on the quality of the water. Therefore, the first electronic control unit 7 can be replaced with the second electronic control unit 22 and the first electronic control unit 7 can be removed.

The internal combustion engine system 20 is part of a motor vehicle (not shown) configured for implementing the method of controlling water injection in an internal combustion engine fora motor vehicle in case of freezing cold weather.

Method 100 may be carried out by the first electronic control unit 7 and may be stored at the first electronic control unit 7 as executable instructions in non-transitory memory. Instructions for carrying out method 100 may be executed by the first electronic control unit 7 based on instructions stored on the non-transitory memory of the first electronic control unit 7 and in conjunction with measurement information received from the temperature determining means 2 and the electrical conductivity sensor 3.

LIST OF REFERENCES

1: water injection tank
2: temperature determining means
3: electrical conductivity sensor
4: comparator
5: water injection pump
6: injection line
7: first electronic control unit
8: heater
9: quality sensor device
10: water injection system
11: water delivery module
20: internal combustion engine system
21: internal combustion engine
22: second electronic control unit
30: water

The invention claimed is:

1. A method of controlling water injection in an internal combustion engine for a motor vehicle, the method comprising:
   (a) determining a temperature T of the water contained in a water injection tank around a conductivity sensor,
   (b) determining a quality of the water, which comprises:
      (b10) disapproving the quality of the water if the electrical conductivity σ of the water is not approximately zero,
   (c) preventing water injection if the quality of the water is disapproved,
   wherein step (b) is performed when the determined temperature T of the water is below 0° C.,
   wherein the method further comprises:
      (b20) approving at step (b) the quality of the water if the electrical conductivity σ of the water is approximately zero when the determined temperature T of the water is higher than a predetermined threshold $T_{min}$, and
   (d) allowing water injection if the quality of the water is approved,
   wherein the value of the predetermined threshold $T_{min}$ is higher than −4° C.

2. The method according to claim 1,
   wherein the value of the predetermined threshold $T_{min}$ is higher than −2° C.

3. The method according to claim 1, wherein the water is heated when the determined temperature T is less than the predetermined threshold $T_{min}$ until the determined temperature T reaches at least the predetermined threshold $T_{min}$.

4. The method according to claim 1, wherein the electrical conductivity σ of the water is approximately zero when its value σ is less than or equal to a predetermined threshold of electrical conductivity $\sigma_{max}$, wherein the value of the predetermined threshold of electrical conductivity $\sigma_{max}$ is 30 μS/cm.

5. The method according to claim 4, wherein the value of the predetermined threshold of electrical conductivity $\sigma_{max}$ is 20 μS/cm.

6. The method according to claim 5, wherein the value of the predetermined threshold of electrical conductivity $\sigma_{max}$ is 10 μS/cm.

7. A water injection system configured for implementing the method of controlling water injection in an internal combustion engine for a motor vehicle according to claim 1, the water injection system comprises:
   a water injection tank for storing the water,
   an electrical conductivity sensor for sensing the electrical conductivity σ of the water in the water injection tank,
   a temperature determining means for determining the temperature T of the water in the water injection tank around the conductivity sensor,
   a comparator for comparing the sensed electrical conductivity σ to the predetermined threshold of electrical conductivity $\sigma_{max}$,
   a water injection pump for supplying water from the water injection tank to an injection line configured to be connected to the internal combustion engine,
   a first electronic control unit for approving or disapproving the quality of the water.

8. The water injection system according to claim 7, wherein the water injection system is configured for sensing the electrical conductivity σ of the water in the water injection tank when the determined temperature T is higher than a predetermined threshold $T_{min}$, the predetermined threshold $T_{min}$ being higher than −2° C.

9. The water injection system according to claim 8, wherein the predetermined threshold $T_{min}$ is higher than −2° C.

10. The water injection system according to claim 8, wherein the water injection system further comprises a heater for heating the water stored in the water injection tank when the determined temperature T is less than the predetermined threshold $T_{min}$ until the determined temperature T reaches at least the predetermined threshold $T_{min}$.

11. The water injection system according to claim 7, wherein the temperature determining means comprise a temperature sensor.

12. The water injection system according to claim 11, wherein the temperature sensor and the electrical conductivity sensor each comprise a sensing surface, and the distance between the sensing surface of the temperature sensor and the sensing surface of the electrical conductivity sensor is 30 mm or less.

13. The water injection system according to claim 11, wherein the temperature sensor and the electrical conductivity sensor are part of a quality sensor device.

14. The water injection system according to claim 7, wherein the water injection tank comprises a water delivery module.

15. The water injection system according to claim 14, wherein the water delivery module comprises the water injection pump, the temperature determining means, the electrical conductivity sensor and the heater.

16. An internal combustion engine system configured for implementing the method of controlling water injection in an internal combustion engine for a motor vehicle according to claim 1, the internal combustion engine system comprises:
 an internal combustion engine, and
 a water injection system including
  a water injection tank for storing the water, an electrical conductivity sensor for sensing the electrical conductivity $\sigma$ of the water in the water injection tank,
  a temperature determining means for determining the temperature T of the water in the water injection tank around the conductivity sensor,
  a comparator for comparing the sensed electrical conductivity $\sigma$ to the predetermined threshold of electrical conductivity $\sigma_{max}$,
  a water injection pump for supplying water from the water injection tank to an injection line configured to be connected to the internal combustion engine,
  a first electronic control unit for approving or disapproving the quality of the water, and
  a second electronic control unit for allowing or preventing water injection by controlling the water injection pump.

17. A motor vehicle comprising an internal combustion engine system according to claim 16.

18. A non-transitory computer-readable medium comprising instructions of controlling water injection in an internal combustion engine for a motor vehicle, which, when executed by a processor, cause the processor to perform steps according to claim 1.

\* \* \* \* \*